United States Patent [19]

Nishioka

[11] 3,905,520

[45] Sept. 16, 1975

[54] VACUUM FLASK PROVIDED WITH A PUMPING DEVICE

[75] Inventor: Naruo Nishioka, Osaka, Japan

[73] Assignee: National Mahoobin Kogyo Kabushiki Kaisha, Sakai, Japan

[22] Filed: Apr. 10, 1974

[21] Appl. No.: 459,807

[30] Foreign Application Priority Data

Apr. 10, 1973  Japan................................ 48-43468

[52] U.S. Cl................................ 222/209; 222/383
[51] Int. Cl.².......................................... B67D 5/42
[58] Field of Search..................... 222/209, 383, 385

[56] References Cited
UNITED STATES PATENTS

| | | |
|---|---|---|
| 452,643 | 5/1891 | Heitmann ........................... 222/209 |
| 1,715,429 | 6/1929 | Saugman............................. 222/209 |
| 2,680,477 | 6/1954 | Schira............................... 222/209 X |
| 3,214,066 | 10/1965 | Shirley et al........................ 222/209 |
| 3,726,442 | 4/1973 | Davidson et al................ 222/209 X |

Primary Examiner—Stanley H. Tollberg
Assistant Examiner—John P. Shannon
Attorney, Agent, or Firm—Stewart and Kolasch, Ltd.

[57] ABSTRACT

This invention is directed to a vaccum flask capable of pouring a liquid contained therein into a drinking cup without tilting the flask by simply working a bellow element from the outside while the flask stands upright on a table. The bellows element is removably fixed inside the lid of the flask, independent of the plug and the internal vessel.

6 Claims, 3 Drawing Figures

VACUUM FLASK PROVIDED WITH A PUMPING DEVICE

BACKGROUND AND SUMMARY OF THE INVENTION

The present invention relates to a vacuum flask for keeping liquids hot or cold for a long period of time and more particularly to a vacuum flask including a bellow element for pumping up the liquid contained therein into a drinking cup.

A vacuum flask or bottle is well known, and widely used in the home, on a picnic, at school, etc. The principle of the vacuum bottle is that the bottle has double walls with the space between said walls being evacuated so as to provide walls which are nonconductors of heat. Normally, the double walls are made of glass, although metal is sometimes utilized. However, it is known that glass walls are more efficient. The disadvantage of using glass walls is that they are brittle, and thus tend to break, and therefore, it is required to handle the bottle with special care. Nevertheless, it is well known that many bottles are broken by the slip of the hand. Such accidents generally occur when a minor, a woman or an old person handles a bottle which is full or a liquid.

The present invention is directed to solving the disadvantages and inconveniences of known vacuum flasks pointed out above, and has for its object to provide a vacuum flask capable of pouring the liquid contained into a drinking cup without tilting the flask by hand but rather by simply operating a lever thereon while it stands upright on a table.

According to the present invention, a vacuum flask includes a bellows element for pumping up the liquid contained in the flask into a drinking cup, the bellows element being housed inside the lid and operable from the outside of the flask. A plug is removably fitted at the junction of the double walls through which a bore is provided for passing the pressurized air from the bellows onto the liquid surface, and a tube is disposed in the plug for permitting the liquid to rise up to the outlet.

In a further embodiment of the vacuum flask according to the present invention, the plug is made diametrically smaller than the opening of the double-walled vessel so as to produce a gap therebetween which is airtightly covered by a flange portion of the plug, thereby preventing the liquid contained in the vessel from overflowing out of the outlet due to the increased internal pressure produced when the plug is fitted in the filled vessel.

Advantageously, according to the present invention, the bellows element is removably arranged inside the lid, independent of the plug and the double-walled vessel, thereby making it possible to remove the bellows for cleaning or repairing purposes. Since the bellows element is solely disposed in the lid, the plug can be also handled separately from the bellows when a fresh liquid is introduced into the flask.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
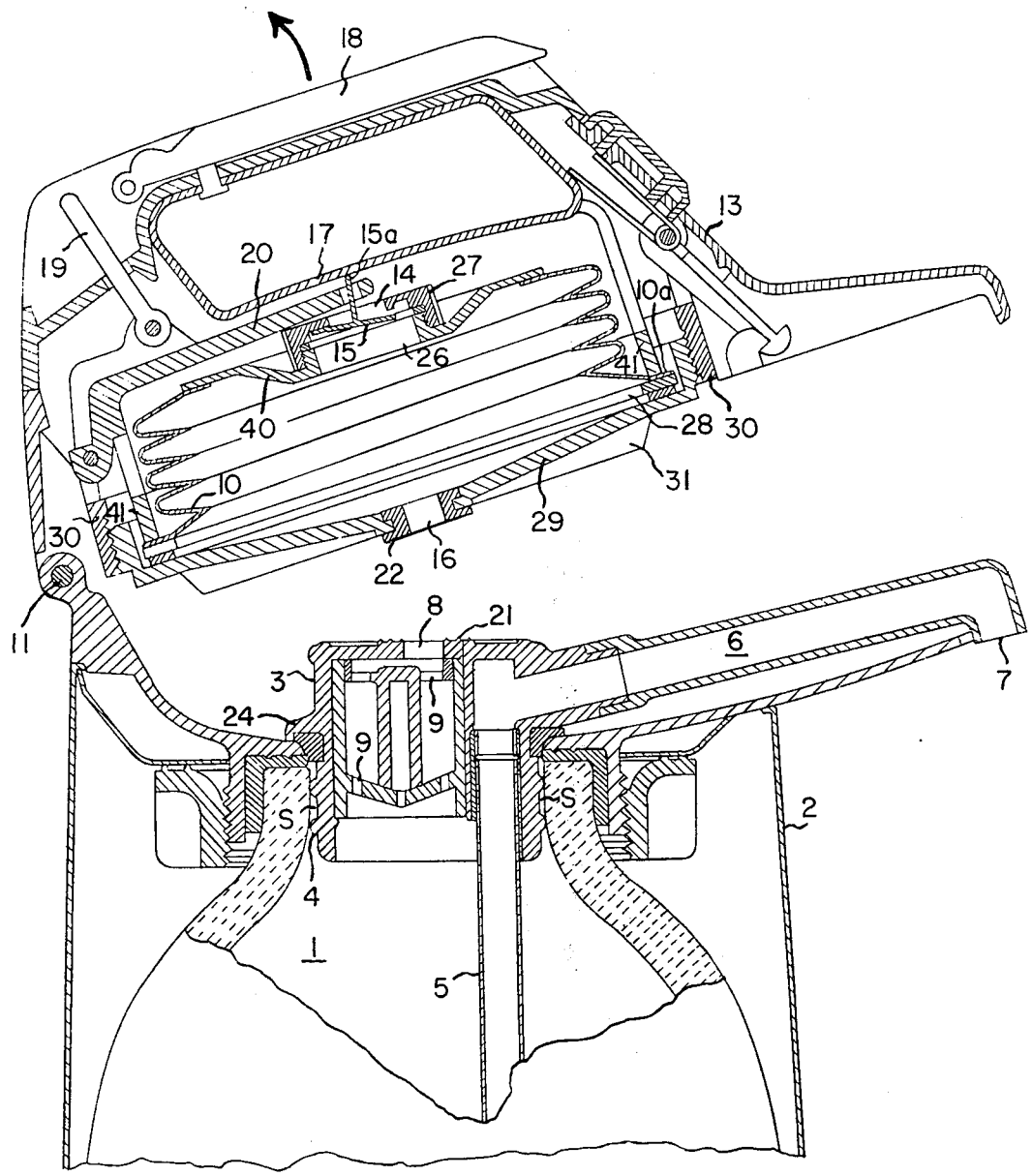
FIG. 1 is a transverse cross-section showing the main portion of the vacuum flask according to the present invention.
Figure 2:
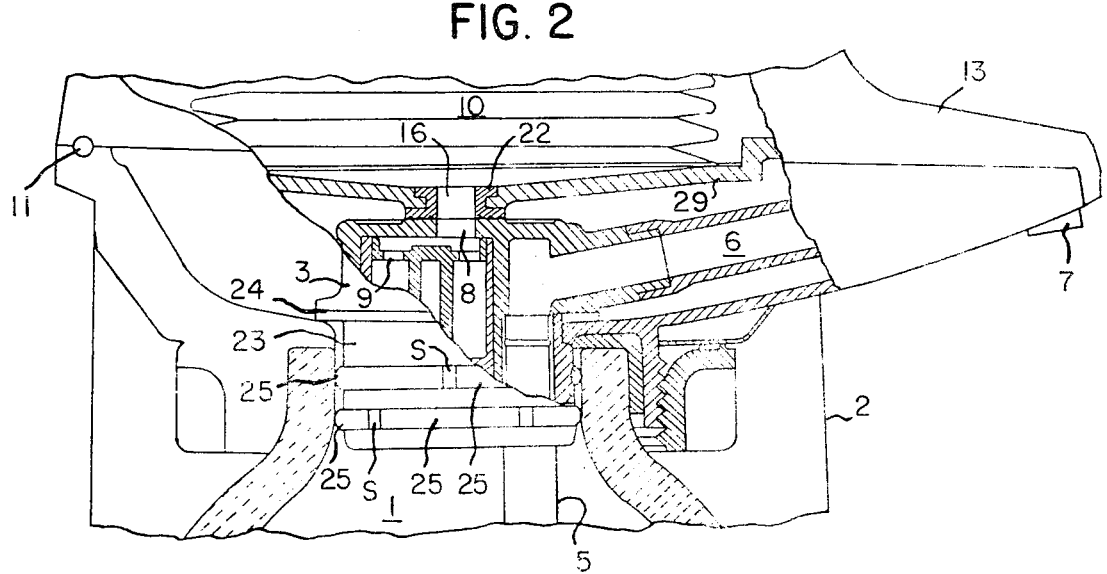
FIG. 2 is a transverse cross-section showing the main portion illustrated in FIG. 1 when the lid is closed.

Referring to FIG. 1, an inner double-walled glass vessel 1 is housed in an outer casing 2, for example, by means of a cork pad (not shown), and the space between the walls is evacuated. Advantageously, the glass walls are silvered so as to reduce radiation to a minimum. A plug 3 is fitted in the opening of the vessel 1, with projections 4 on the trunk thereof, thereby producing gaps S therebetween. The projections 4 are made of rubber or similar liquid-tight material. The plug 3 has a tube 5 embedded therein for allowing the liquid contained in the vessel 1 to rise up the tube. The tube inside the vessel terminates at a point adjacent to the bottom of the vessel. The top portion of the tube communicates with an outlet 7, from which the liquid contained in the vessel is introduced into a drinking cup (not shown). The tube 5 is eccentrically positioned in the plug 3, such that the path 6 up to the outlet 7 is shortened as much as possible.

On the top surface of the plug 3, there is provided an aperture 8 which communicates with the inside of the vessel 1 through further apertures 9 provided within the plug. The aperture 8 enables pressurized air supplied from bellows 10 to be exerted on the liquid surface in the vessel 1.

The bellows 10 are removably fixed inside a lid 13, which is pivotally supported on the casing 2 by means of a pivot 11. The bellows element 10 has a ring 28 fixed at one open end, and a metal element 40 at the other open end, said metal element being provided with an aperture 26. The metal element 40 has a mouthpiece 27 capped thereon, with a check valve 15 interposed in a free state therebetween. The check valve 15 has the shape of an inverted T-letter having a leg 15a which is projected so as to ensure its engagement with the lower member of the internal framework 17. Preferably, it is arranged that the mouthpiece 27 is screwed on the metal element 40 for ensuring its removal therefrom. Beneath the ringed open end of the bellows element, there is provided a coverage element 29 screwed into the ring-shaped threaded flange 30, whereby the ringed edge 10a is held against the ring-shaped inner wall 41. Thus, when the coverage element 29 is removed, the bellows are likewise ready for removal. The coverage element 29 is provided with an aperture 16, around which a ring 22 of elastic material, such as rubber, is fitted. By virtue of the liquid-tight property of the ring 22, pressurized air is prevented from leaking from the apertures 8 and 16 when they are in engaging alignment.

The mouthpiece 27 has an opening 14 communicating to the inside of the bellows, and in the space between the mouthpiece 27 and the metal element 40, the check valve 15 is freely confined with the leg 15a thereof being placed in abutment with the lower member of the framework 17, such that the opening 14 is maintained in the open position for taking in air. However, when the bellows are contracted to pressurize air as described below, the leg 15a of the check valve is freed from its abutment with the framework 17, thereby enabling the check valve to close the opening 14 under the backpressure in the bellows. Thus, the pressurized air is introduced into the inside of the vessel 1 through the apertures 8 and 16, thereby exerting pressure on the liquid surface which forces the liquid out of the outlet 7 via the tube 5.

In a preferred embodiment of the present invention, the operation of the bellows 10 is carried out by swinging a bar 18 in the direction indicated by the arrow in FIG. 1, thereby enabling a pusher 20 to work on the bellows through an intermediate bar 19. When the operation of the bellows is stopped by returning the bar 18 to its starting position, the bellows spontaneously resumes its normal bulky condition by virtue of its own flexibility. At this stage, the internal pressure is relatively low enough so that outside air is readily introduced into the bellows through the opening 14.

As described above, the coverage element 29 is provided with a ring 22 of liquid-tight or elastic material, such as rubber, and therefore, when the apertures 8 and 16 communicate with each other, the possible leakage of pressurized air is avoided. In the embodiment illustrated, ring-shaped projections 21 are additionally produced around the aperture 8 so as to ensure a liquid-tight connection between the apertures 8 and 16.

In addition, the gap S is optionally produced between the plug 3 and the inner glass wall of the vessel so that with the aid of the projections 4 and 25, an increment of internal air pressure is permitted to deviate into the gaps S so as to avoid an unexpected overflowing of the liquid out of the outlet 7 when the plug 3 is fitted in the filled vessel 1.

Figure 3:
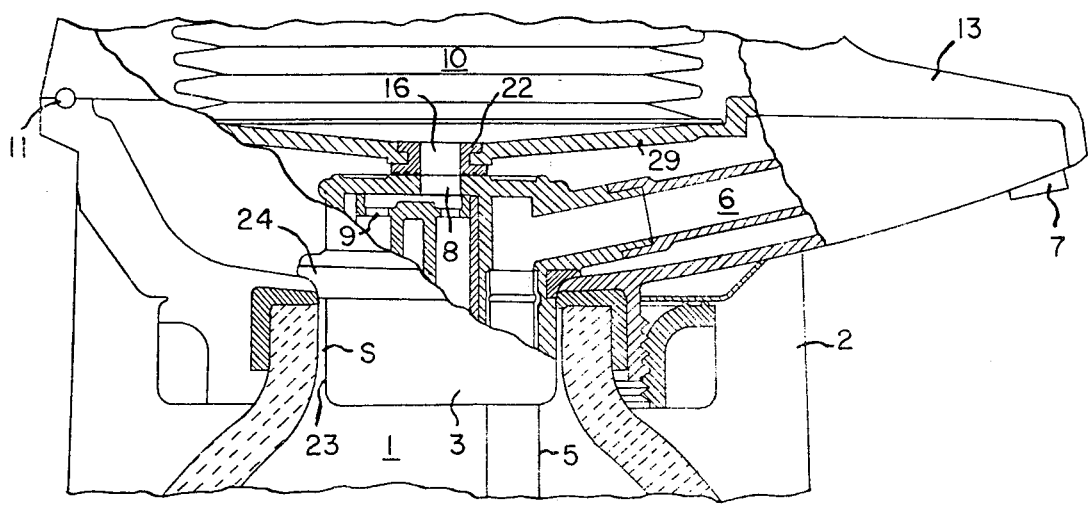
FIG. 3 is a transverse cross-section showing the main portion of a vacuum flask including a further embodiment of plug.

In the embodiment illustrated in FIG. 3, no projection is provided on the trunk 23 of the plug 3. In either case, the opening of the vessel 1 is air-tightly covered by a ring-shaped flange 24 formed in the middle of the trunk of the plug 3, thereby preventing the heat confined in the vessel from escaping to the outside thereof.

When the bellows are made of rubber, they especially tend to become stained and insanitary due to thermal effects. Accordingly, it is necessary to clean the inside of the bellows from time to time. According to the present invention, the bellows are ready for removal simply by unfastening the coverage element 29. The frequent cleaning of the bellows is helpful for holding the deterioration of the bellows element to mininum.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A vacuum flask comprising an internal doublewalled vessel provided with a lid, a bellows element removably and completely housed in said lid, said bellows element having first and second coverging open ends, a plug removably disposed in the opening of said double-walled vessel, said plug being provided with an aperture communicating with the inside of said double-walled vessel and said bellows element when the lid is in the closed position, a tube embedded in said plug for allowing a liquid contained in said vessel to be pumped therefrom, said tube communicating to an outlet tube, a check valve floatingly confined in said first converging open end of said bellows element, said check valve being adapted to close up said first coverging open end of the bellows element under the backpressure produced by said bellows element, said second converging open end of said bellows element and said aperture in said plug being in aligment when the lid is closed over said double-walled vessel.

2. The vacuum flask as claimed in claim 1, wherein the plug contains a trunk, said trunk being provided with a plurality of projections thereon so as to produce a gap between said trunk and the inside wall surface of said double-walled vesesl, and a ring-shaped flange disposed above said projections so as to cover up said gap.

3. The vacuum flask as claimed in claim 1, wherein the bellows element is supported by a covering means in screw engagement with said lid, said covering means having an aperture taking the place of said second converging open end of the bellows element.

4. The vacuum flask as claimed in claim 1, wherein the check valve has the shape of an inverted T-letter, having its leg portion projecting outside from said first converging open end of the bellows element.

5. A vacuum flask as claimed in claim 3, wherein the aperture in the plug is surrounded by ring-shaped projections, and the aperture provided in said second converging open end of the bellows element is produced of elastic material, thereby enabling said projections to be embedded in said elastic element when the lid is applied over the internal double-walled vessel.

6. A vacuum flask as claimed in claim 1, wherein the tube is located in the rim portion of the plug facing the outlet, thereby shortening the distance from said tube to said outlet.

* * * * *